United States Patent
Yamazaki

(10) Patent No.: US 9,721,184 B2
(45) Date of Patent: Aug. 1, 2017

(54) APPARATUS AND METHOD FOR PICKING UP ARTICLE RANDOMLY PILED USING ROBOT

(71) Applicant: FANUC Corporation, Yamanashi (JP)

(72) Inventor: Takashi Yamazaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 334 days.

(21) Appl. No.: 14/532,697

(22) Filed: Nov. 4, 2014

(65) Prior Publication Data
US 2015/0124057 A1    May 7, 2015

(30) Foreign Application Priority Data
Nov. 5, 2013    (JP) ................. 2013-229609

(51) Int. Cl.
| | | |
|---|---|---|
| G06K 9/52 | (2006.01) | |
| B25J 9/16 | (2006.01) | |
| G06K 9/00 | (2006.01) | |
| G06K 9/34 | (2006.01) | |
| G06T 7/73 | (2017.01) | |

(52) U.S. Cl.
CPC ............ *G06K 9/52* (2013.01); *B25J 9/1697* (2013.01); *G06K 9/00201* (2013.01); *G06K 9/342* (2013.01); *G06T 7/73* (2017.01); *G05B 2219/40053* (2013.01); *G05B 2219/40564* (2013.01); *G06T 2207/10012* (2013.01); *G06T 2207/30164* (2013.01); *G06T 2207/30172* (2013.01); *Y10S 901/09* (2013.01)

(58) Field of Classification Search
CPC .................... H04N 13/0203; H04N 13/0246
See application file for complete search history.

(56) References Cited

U.S. PATENT DOCUMENTS

2013/0151007 A1*    6/2013    Valpola ............. B25J 9/1694
                                                              700/245

FOREIGN PATENT DOCUMENTS

| JP | 6-44372 A | 2/1994 |
|---|---|---|
| JP | 2004-295223 A | 10/2004 |

(Continued)

OTHER PUBLICATIONS

Kensuke Harada et al, "Bin picking method based on cylindrical approximation of objects", Proceeding of the 30th Annual Conference of the Robotics Society of Japan, 2012, for which an explanation of relevance is attached.

*Primary Examiner* — Nam Pham
(74) *Attorney, Agent, or Firm* — Hauptman Ham, LLP

(57) ABSTRACT

An article pickup apparatus configured so as to measure surface positions of articles randomly piled on the three-dimensional space using a three-dimensional measurement instrument to acquire position information of three-dimensional points, determine a connected set made by connecting three-dimensional points present in the vicinity of each other among the three-dimensional points, and identify a position and posture of an article based on the position information of three-dimensional points belonging to the connected set. The posture of the article is identified by calculating a main component direction of the connected set by applying main component analysis to the three-dimensional points belonging to the connected set and identifying the posture of the article based on the main component direction.

5 Claims, 14 Drawing Sheets

(56) References Cited

FOREIGN PATENT DOCUMENTS

| | | |
|---|---|---|
| JP | 2005-331285 A | 12/2005 |
| JP | 2011-8809 A | 1/2011 |
| JP | 2011-022084 A | 2/2011 |
| JP | 2011-167815 A | 9/2011 |
| JP | 2011-179909 A | 9/2011 |
| JP | 2011-248457 A | 12/2011 |
| JP | 2012-217791 A | 11/2012 |
| JP | 2013-184279 A | 9/2013 |
| JP | 2013-217893 A | 10/2013 |
| WO | 2012/011579 A1 | 1/2012 |

* cited by examiner

FIG. 1
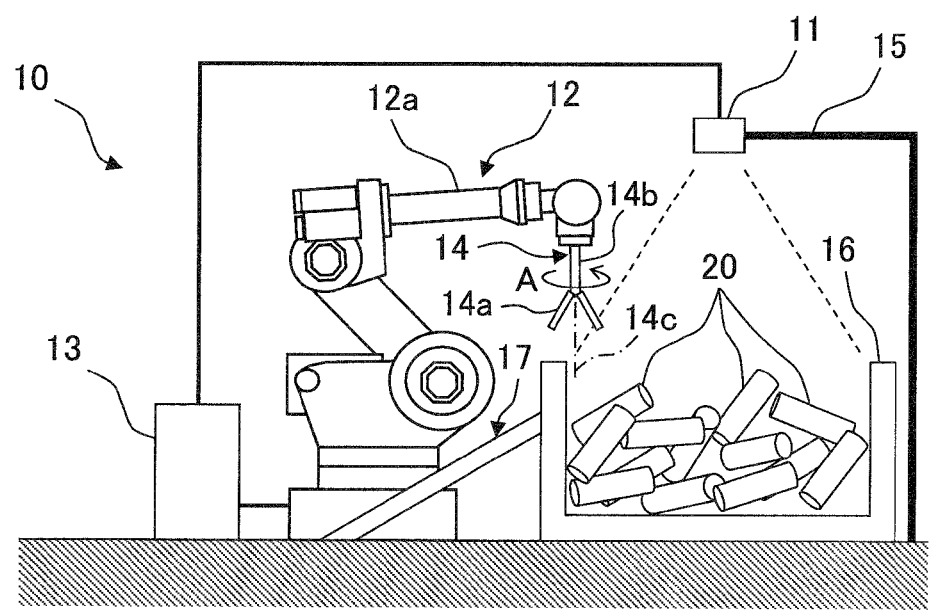
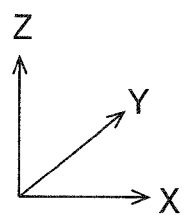

APPARATUS AND METHOD FOR PICKING UP ARTICLE RANDOMLY PILED USING ROBOT

RELATED APPLICATIONS

The present application claims priority to Japanese Application Number 2013-229609, filed Nov. 5, 2013, the disclosure of which is hereby incorporated by reference herein in its entirety.

BACKGROUND OF THE INVENTION

1. Field of the Invention

The present invention relates to an article pickup apparatus and an article pickup method for recognizing a position and a posture of an article randomly piled in a three-dimensional space and for picking up the recognized article using a robot.

2. Description of the Related Art

As an apparatus of this type, conventionally, there is known an apparatus configured to recognize a position of an article by applying pattern matching to a two-dimensional image obtained by imaging articles randomly piled using a camera or a three-dimensional point set obtained by measurement using a three-dimensional measurement instrument. Such an apparatus is described, for example, in Japanese Laid-open Patent Publication No. 2004-295223 (JP2004-295223A) and Japanese Laid-open Patent Publication No. 2011-179909 (JP2011-179909A). Further, an apparatus configured to calculate a three-dimensional posture of a rotating body using two images obtained by stereoscopic photography is also known. This apparatus is described, for example, in Japanese Laid-open Patent Publication No. 2011-022084 (JP2011-022084A).

In the apparatus described in JP2004-295223A, a two-dimensional model pattern is previously prepared from a two-dimensional image obtained by imaging an article having a standard three-dimensional relative posture, a plurality of transform two-dimensional model patterns are prepared by applying two-dimensional geometric transform to the two-dimensional model pattern, and two-dimensional pattern matching is applied to a two-dimensional image of an article using the plurality of transform two-dimensional model patterns.

In the apparatus described in JP2011-179909A, while a three-dimensional model pattern of an article is previously acquired from a CAD model or the like, surfaces of articles in a three-dimensional space are measured using a three-dimensional measurement instrument and a three-dimensional point set (an distance image) is acquired, and then the three-dimensional point set is divided into partial regions surrounded by an edge extracted from the three-dimensional point set. Then, initially, one of the partial regions is set as an article region, and both matching processing of the three-dimensional model pattern for the article region and update processing for adding another partial region to the article region are repeated to measure positions and postures of the articles.

In the apparatus described in JP2011-022084A, using a pair of cameras, a pair of images are acquired by imaging a rotating body from different directions, a center axis of the rotating body is set by calculating a main component axis of the rotating body via main component analysis with respect to each pair of images, and three-dimensional information of the center axis is determined based on the principle of triangulation using a pair of images to calculate a posture of the rotating body.

However, in the apparatuses described in JP2004-295223A and JP2011-179909A, it is necessary to previously prepare a two-dimensional model pattern or a three-dimensional model pattern for each kind of article, and therefore, time and effort are needed. Further, in the apparatus described in JP2011-022084A, a posture of a rotating body is calculated using two images stereoscopically photographed and therefore, a pair of cameras needs to be provided, resulting in a large-scale apparatus configuration.

SUMMARY OF THE INVENTION

An article pickup apparatus according to an aspect of the present invention includes: a robot including a hand capable of holding an article; a three-dimensional measurement instrument measuring surface positions of a plurality of articles randomly piled on a three-dimensional space to acquire position information of a plurality of three-dimensional points on surfaces of articles; a connected set calculation unit determining a connected set made by connecting the three-dimensional points present in the vicinity of each other among the plurality of three-dimensional points acquired by the three-dimensional measurement instrument; an article identification unit identifying a position and a posture of an article based on the position information of three-dimensional points belonging to the connected set; a hand position posture calculation unit determining a hand position posture, the hand position posture being a position and a posture of the hand capable of picking up the article identified by the article identification unit; and a robot control unit controlling the robot so as to move the hand to the hand position posture determined by the hand position posture calculation unit to pick up the article, wherein the article identification unit calculates a main component direction of the connected set by applying main component analysis to the three-dimensional points belonging to the connected set, and identifies the posture of the article based on the main component direction.

Another aspect of the present invention is an article pickup method for picking up the article randomly piled on a three-dimensional space using a robot including a hand capable of holding the article, the method includes: measuring, by a three-dimensional measurement instrument, surface positions of a plurality of articles randomly piled on the three-dimensional space to acquire position information of a plurality of three-dimensional points on surfaces of articles; determining a connected set made by connecting three-dimensional points present in the vicinity of each other among the plurality of three-dimensional points acquired by the three-dimensional measurement instrument; identifying a position and a posture of an article based on the position information of three-dimensional points belonging to the connected set; determining a hand position posture, the hand position posture being a position and a posture of the hand capable of picking up the article, the position and the posture of which are identified; and controlling the robot so as to move the hand to the hand position posture determined to pick up the article, wherein the identifying the posture of the article includes calculating a main component direction of the connected set by applying main component analysis to the three-dimensional points belonging to the connected set, and identifying the posture of the article based on the main component direction.

BRIEF DESCRIPTION OF THE DRAWINGS

Objects, features, and advantages of the present invention will become further apparent from the following description of an embodiment when taken with the accompanying drawings in which:

FIG. 1 is a view illustrating a schematic configuration of an article pickup apparatus according to one embodiment of the present invention;

DETAILED DESCRIPTION

Figure 2:
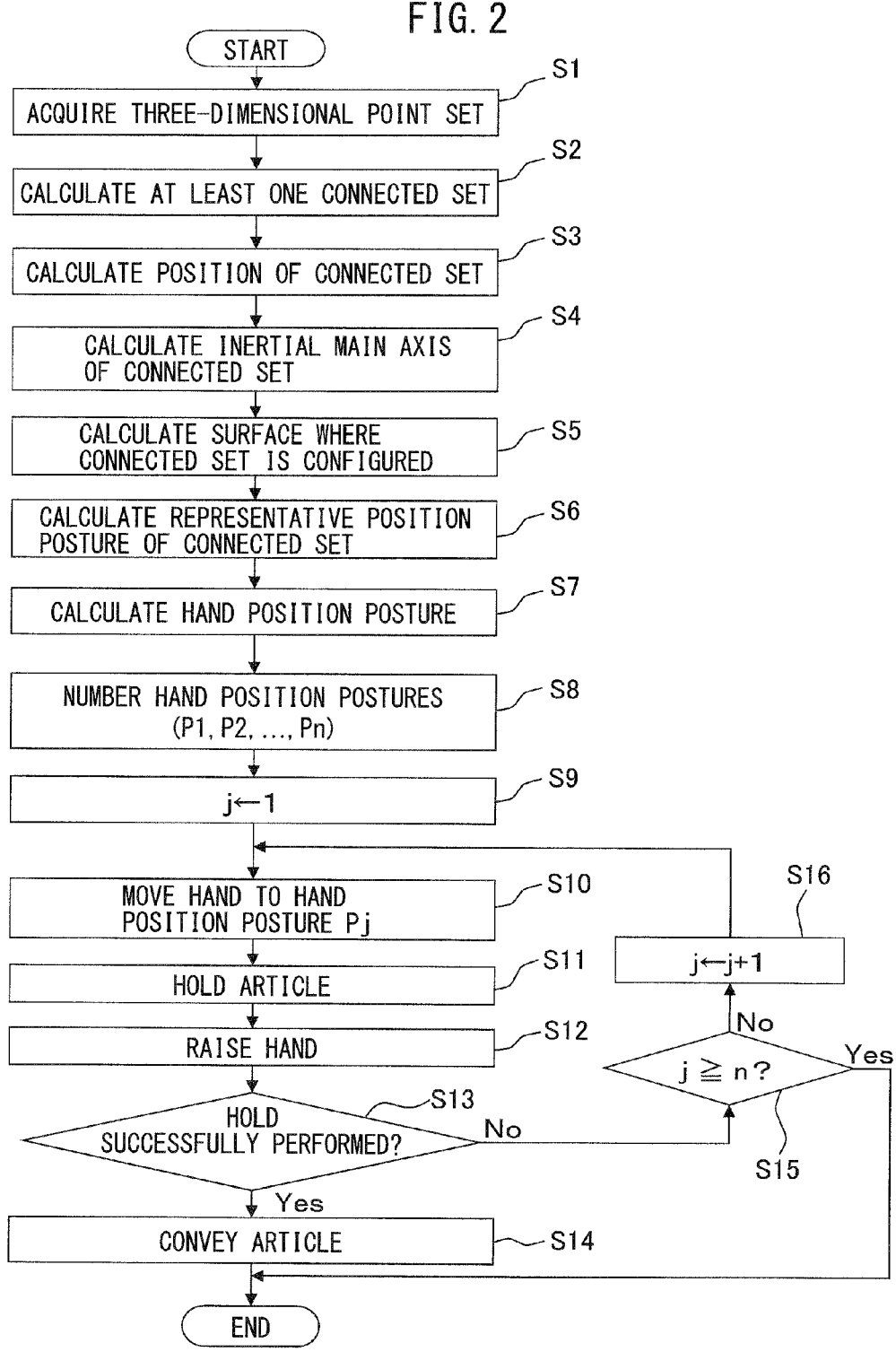
FIG. 2 is a flowchart illustrating one example of processing executed in a robot control device of FIG. 1.

Hereinafter, with reference to FIG. 1 to FIG. 18, an article pickup apparatus according to the embodiment of the present invention will be described. FIG. 1 is a view illustrating a schematic configuration of an article pickup apparatus 10 according to one embodiment of the present invention. The article pickup apparatus 10 includes a three-dimensional measurement instrument 11, a robot 12, and a robot control device 13 for controlling the robot 12 by being connected to the three-dimensional measurement instrument 11 and the robot 12. The robot 12 includes a hand 14 mounted on a tip of an arm 12a. A container 16 is disposed sideward of the robot 12. Together therewith, FIG. 1 illustrates an orthogonal three-axis coordinate system of X, Y, and Z. The Z-direction is a vertical direction, and the X-direction and the Y-direction are horizontal directions.

In the container 16 opened upward, a plurality of articles 20 are randomly piled. The article pickup apparatus 10 of the present embodiment recognizes a position and a posture of an article 20 to be picked up while the plurality of articles 20 are randomly piled, and then holds and picks up the recognized article 20 from the container 16 using the hand 14. Further, the article pickup apparatus 10 conveys the picked-up article 20 to a discharge apparatus 17 disposed sideward of the container 16 via an operation of the robot 12 to discharge the article 20. FIG. 1 illustrates a plurality of articles 20 as the same cylindrical shape as each other, but any shape other than the cylindrical shape is employable and those including a plurality of kinds are employable. In the following description, in some cases, the article 20 to be held by the hand 14 is expressed using a sign 21 (refer to FIG. 14) for discrimination from other articles in the container 16.

The hand 14 is disposed on a tip of a rotary shaft 14b and includes a pair of grip units 14a of a magnet type formed into a bifurcated shape. The pair of grip units 14a is symmetrical to an axis line 14c passing through the center of the rotary shaft 14b and is rotatable in an arrow A direction around the axis line 14c (refer to FIG. 12). The magnet is an electromagnetic type and can be freely switched on (active) and off (inactive) by the robot control device 13. The hand 14 is appropriately modified according to a shape of the article 20 and a configuration of the container 16 and a configuration of the hand 14 are not limited to the configuration of FIG. 1.

While a posture (a direction of the axis line 14c and a rotation angle of the arrow "A" direction) of the grip unit 14a is controlled along an outer periphery of a cylindrically shaped article 20, the grip unit 14a approaches an article 20 to be picked up and holds the article 20 by switching on the electromagnet. Thereafter, the hand 14 is raised by operating the robot 12. Thereby, the held article 21 is picked up upward from other articles 20 (refer to FIG. 14). At that time, a relative posture of the hand 14 to the article 21 is constant, and the hand 14 is changed so as to have a posture corresponding to a shape of the discharge apparatus 17 (for example, a posture in which the center axis of the article 21 is directed to a Y-axis direction) while moving to above the discharge apparatus 17. Thereby, the article 21 can be transferred from the hand 14 with a constant posture with respect to the discharge apparatus 17.

The three-dimensional measurement instrument 11 is disposed above a central portion of the container 16 and measures a surface of an exposed article 20 among a plurality of articles 20 randomly piled in the container 16 to acquire position information (three-dimensional information) of a plurality of three-dimensional points. A measurement range of the three-dimensional measurement instrument 11 needs to include the container 16 but an excessively large measurement range decreases measurement resolution. Therefore, preferably, the measurement range is equivalent to an occupied range of the container 16 and, for example, accords with the occupied range of the container 16. In FIG. 1, the three-dimensional measurement instrument 11 is fixed to a dedicated cradle 15 but may be mounted on a tip of the robot 12. The three-dimensional measurement instrument 11 and the robot control device 13 are connected to each other via a communication unit such as a communication cable so as to be communicable with each other.

As the three-dimensional measurement instrument 11, various non-contact types can be used. There are cited, for example, a scanning type using laser slit light, a scanning type using laser spot light, a type of projecting pattern light on articles using a device such as a projector, and a type of utilizing a flight time from emission of light from a projector to incidence to a light receiver via reflection on an article surface.

The three-dimensional measurement instrument 11 expresses the acquired three-dimensional information as the format of a distance image or a three-dimensional map. The distance image is an image in which three-dimensional information is expressed as an image format, and expresses a height of a position on an image or a distance from the three-dimensional measurement instrument 11 using brightness or a color of each pixel of the image. On the other hand, the three-dimensional map is a map in which three-dimensional information is expressed as a set of measured three-dimensional coordinate values (x, y, z). In the present embodiment, each pixel in a distance image or a point having three-dimensional coordinate values in a three-dimensional map is referred to as a three-dimensional point, and a set including a plurality of three-dimensional points is referred to as a three-dimensional point set. The three-dimensional point set is a set of all the three-dimensional points measured using the three-dimensional measurement instrument 11 and can be acquired using the three-dimensional measurement instrument 11.

It is possible for the hand 14 to grip and pick up an article 20 and hold and release the picked-up article 20, and examples of a configuration of the hand capable of performing such operations include a suction nozzle, an attracting magnet, and a suction pad or chuck. An operation of the robot 12 controls a position posture of the hand 14.

FIG. 2 is a flowchart illustrating one example of processing executed in the robot control device 13 and specifically, one example of processing for article pickup. An operation of the article pickup apparatus 10 will be described below with reference to the flowchart of FIG. 2 and drawings associated therewith.

Figure 3:
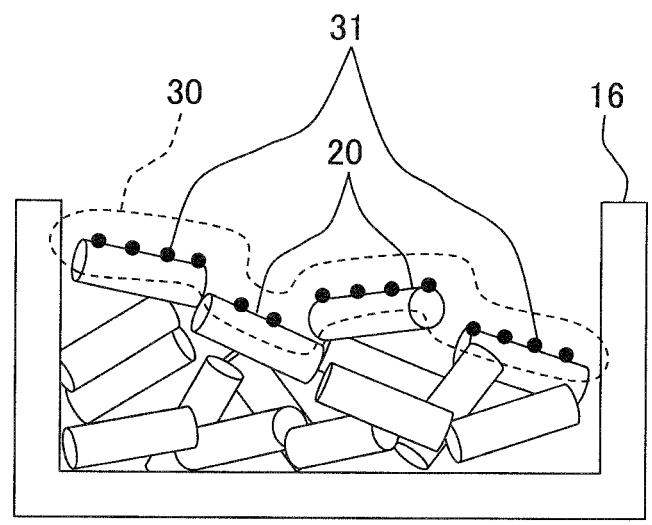
FIG. 3 is a view illustrating one example of a three-dimensional point set acquired using a three-dimensional measurement instrument of FIG. 1.

Processing of FIG. 2 is started when, for example, a pickup start command of an article 20 is input by operating an operation switch not illustrated. Initially, step S1 measures surfaces of a plurality of articles 20 randomly piled in a three-dimensional space using the three-dimensional measurement instrument 11 and then acquires a three-dimensional point set 30. FIG. 3 is a view illustrating one example of the three-dimensional point set 30 acquired using the three-dimensional measurement instrument 11 and three-dimensional points 31 configuring the three-dimensional point set 30. In FIG. 3, the three-dimensional points 31 are illustrated with black circles and the three-dimensional point set 30 is illustrated as a region surrounded by a dotted line including all the black circles.

Figure 4:
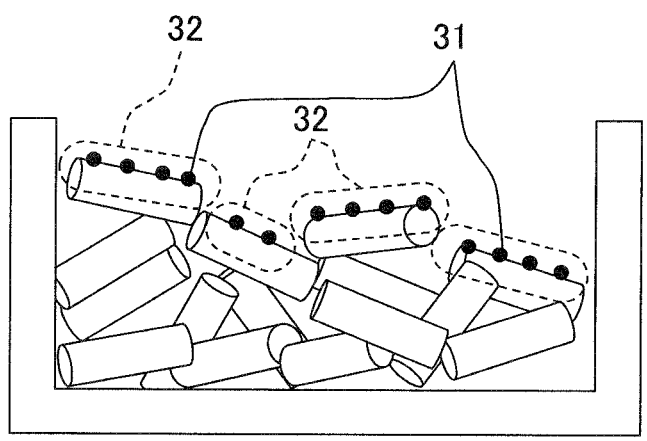
FIG. 4 is a view illustrating one example of a connected set determined from the three-dimensional point set of FIG. 3.

Then, step S2 determines at least one connected set 32 from the three-dimensional point set 30. FIG. 4 is a view illustrating one example of the connected set 32 determined from the three-dimensional point set 30. FIG. 4 illustrates the connected set 32 as a region surrounded by a dotted line. In other words, FIG. 4 illustrates four connected sets 32.

Figure 5:
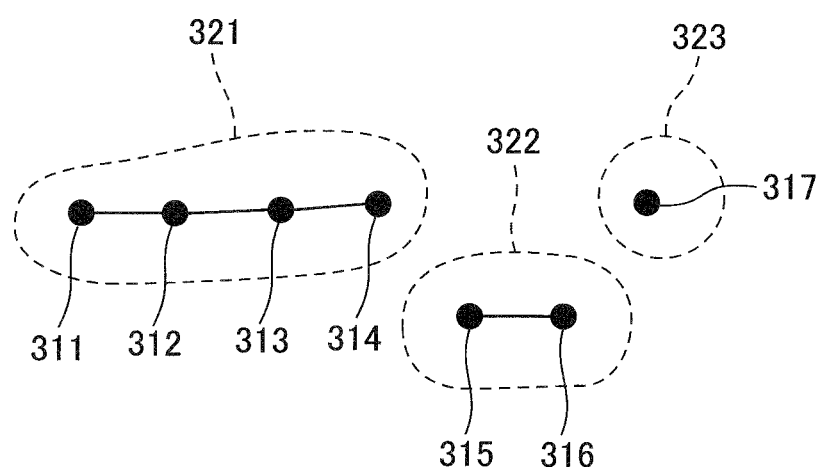
FIG. 5 is a conceptual view illustrating a connected set.

The connected set 32 referred to here refers to a partial set of the three-dimensional point set 30, and when in the vicinity of an arbitrary three-dimensional point (a first three-dimensional point) 31, another three-dimensional point (a second three-dimensional point) 31 different from the former three-dimensional point 31 is present, the connected set 32 refers to a set where the first three-dimensional point 31 and the second three-dimensional set 31 are connected. In other words, the connected set 32 refers to a set of three-dimensional points which are made by connecting three-dimensional points present in the vicinity of each other. FIG. 5 is a view illustrating a concept of the connected set 32. In FIG. 5, when a distance between the first three-dimensional point 31 and the second three-dimensional point 31 next to each other falls within a predetermined value, the first three-dimensional point 31 and the second three-dimensional point 31 are connected with each other.

When as illustrated in FIG. 5, for example, a plurality of three-dimensional points 31 (expressed by 311 to 317) are measured using the three-dimensional measurement instrument 11 and of these, 311 and 312, 312 and 313, 313 and 314, and 315 and 316 are present within a predetermined distance, respectively, these points are connected with each other. In this case, 311 and 314 are also connected via 312 and 313 and therefore, 311 to 314 configure the same connected set 321. On the other hand, 315 and 316 are not connected with any one of 311 to 314 and therefore, configure another connected set 322. Since being not connected with any one of 311 to 316, 317 singly configures a connected set 323.

When surfaces of articles 20 randomly piled is measured using the three-dimensional measurement instrument 11, three-dimensional points 31 (for example, 313 and 314 in FIG. 5) next to each other on the same article 20 are located close to each other. In contrast, in a boundary of articles 20, positions of three-dimensional points (for example, 314 and 315 of FIG. 5) next to each other are largely changed. Therefore, while the three-dimensional points 313 and 314 belong to the same connected set 32, the three-dimensional points 314 and 315 belong to connected sets 32 different from each other. Therefore, when a distance between three-dimensional points configuring a connected set 32, a minimum number of points and a maximum number of points in the connected set 32, and others are appropriately set according to the article 20 and the three-dimensional measurement instrument 11, the connected set 32 can be considered a surface shape of a single article 20. In other words, a single connected set 32 corresponds to a single article 20 on a one-to-one basis, and the article 20 can be identified using the connected set 32.

Figure 6:
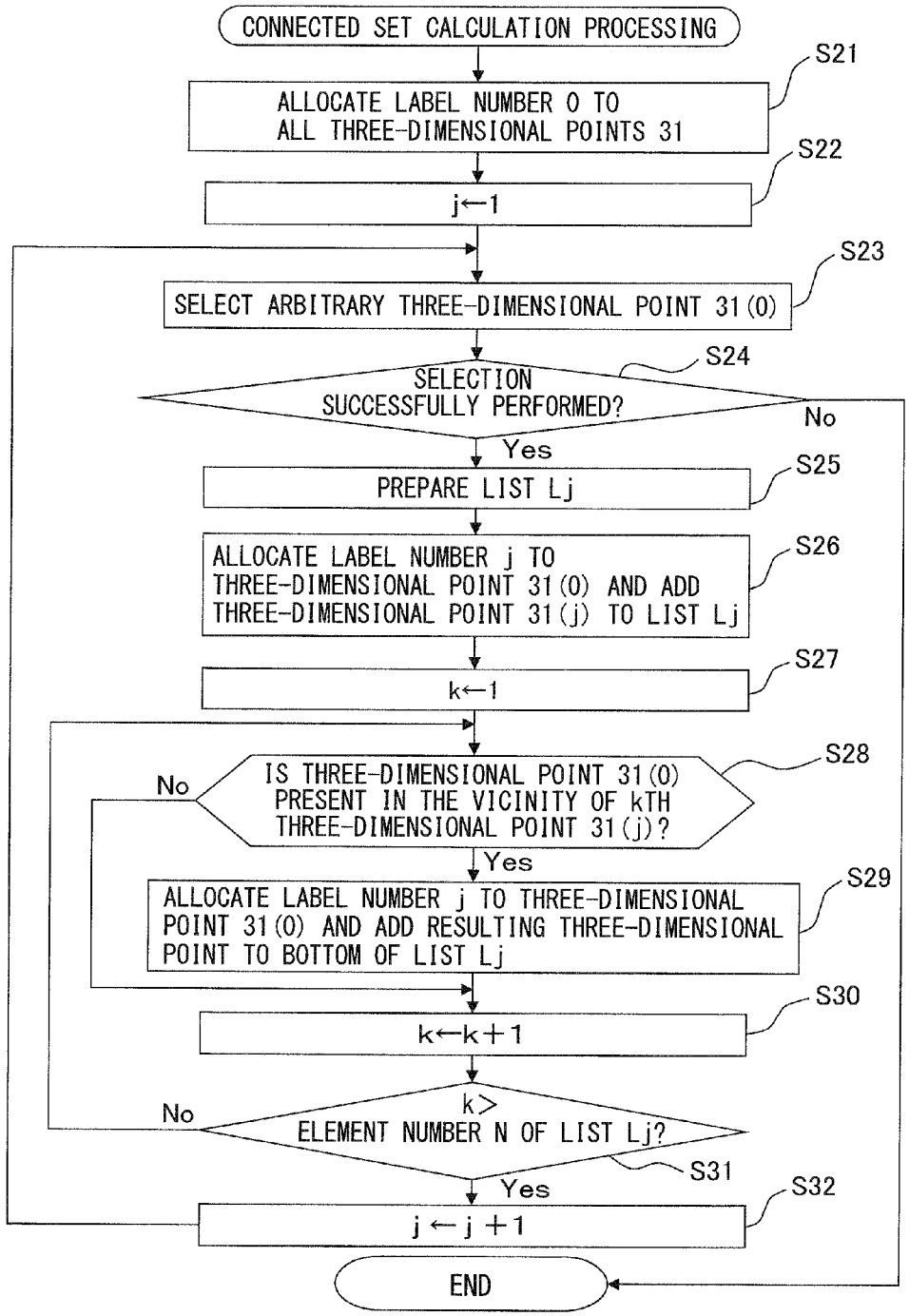
FIG. 6 is a flowchart illustrating details of processing for determining a connected set.

FIG. 6 is a flowchart illustrating processing (connected set calculation processing) for determining a connected set 32, i.e., a flowchart illustrating processing of step S2 of FIG. 2 in more detail. Initially, step S21 allocates a label number 0 indicating no belongingness to any connected set 32 to all the three-dimensional points 31 belonging to the three-dimensional point set 30 as an initial label number. In the following description, a three-dimensional point 31 allocated with a label number j that is a natural number is expressed using 31(j). The label number j is a number allocated corresponding to the connected set 32, and when the same label number j that is not 0 is allocated, belonging to the same connected set 32 is meant. Then, in step S22, to determine a first connected set 32, the label number j is set to be 1 (j←1).

Then, step S23 selects an arbitrary three-dimensional point 31(0) having a label number of 0 which is a three-dimensional point 31 belonging to the three-dimensional point set 30. Step S24 judges whether the three-dimensional point 31(0) having a label number of 0 has been selected, and when a determination of Yes is made, the processing moves to step S25. When the three-dimensional point 31(0) has not been selected, all the three-dimensional points 31 belonging to the three-dimensional point set 30 belong to any one of the connected sets 32. In this case, a determination of No is made in step S24 to end connected set calculation processing and then the processing moves to step S3 of FIG. 2.

Step S25 prepares a list Lj for storing a three-dimensional point 31(j) having a label number of j. Step S26 allocates a label number j to the three-dimensional point 31(0) selected in step S24 and then adds the three-dimensional point 31(j) to the list Lj. In step S27, an initial value 1 is provided for a variable k having a natural number value (k←1). The variable k refers to a number specifying the three-dimensional point 31(j) included in the list Lj. It is assumed that in the list Lj, added three-dimensional points 31(j) are lined up in order of addition.

Step S28 judges whether in the vicinity of a kth three-dimensional point 31(j) of the list Lj, a three-dimensional point 31(0) having a label number of 0 is present. When a determination of Yes is made in step S28, the processing moves to step S29, but when a determination of No is made, the processing passes step S29 and then moves to step S30. Step S29 allocates a label number j to all the three-dimensional points 31(0) determined to be present in the vicinity of the kth three-dimensional point 31(j) of the list Lj and thereafter, adds these three-dimensional points 31(j) to the bottom of the list Lj. Step S30 adds 1 to the variable k (k←k+1).

Step S31 judges whether a value of k is larger than the number (element number N) of three-dimensional points 31(j) stored in the list Lj. The case where k is larger than the element number N indicates that vicinity judgment processing for all N three-dimensional points 31(j) stored in the list Lj has been ended and three-dimensional points present in the vicinity of the three-dimensional points 31(j) in the list Lj have been already stored in the same list Lj. Therefore, processing for adding a three-dimensional point 31(j) to the list Lj is ended and then the processing moves to step S32. In cases other than the above case, vicinity judgment processing for all the three-dimensional points 31(j) in the list Lj has not been ended and therefore, the processing returns to step S28 to repeat processing for adding a three-dimensional point 31(j) to the list Lj.

Step S32 adds 1 to the label number j (j←j+1) and the processing returns to step S23. Thereafter, the same processing as step S23 to step S32 is repeated to determine a connected set 32 corresponding to the next label number j.

The connected set calculation processing described above will be specifically described with reference to FIG. 5. At the start of connected set calculation processing, all the three-dimensional points 311 to 317 do not belong to the connected set 32 and then a label number for the three-dimensional points 311 to 317 is 0 (step S21). To prepare a connected set 32 having a label number of 1 from this state, when, for example, the three-dimensional point 313 is selected (step S23), the three-dimensional point 313 is allocated with a label number 1 (313(1)) and then the three-dimensional point 313 is stored as a first of a list L1 having a label number of 1 (step S26).

Then, it is judged whether the three-dimensional point 31(0) having a label number of 0 is present in the vicinity of the three-dimensional point 313 that is the first of the list L1 (step S28). In this case, the three-dimensional points 312 and 314 having a label number of 0 are present and therefore, these three-dimensional points 312 and 314 each are allocated with a label number 1 (312(1) and 314(1)) and are added as a second and a third of the list L1, respectively (step S29). Thereby, the element number N of the list L1 becomes 3.

Thereafter, the variable k becomes 2 (<N) (step S30) and then it is judged whether in the vicinity of the three-dimensional point 312 that is the second of the list L1, the three-dimensional point 31(0) of a label number of 0 is present (step S28). In this case, the three-dimensional point 311 of a label number of 0 is present and therefore, this three-dimensional point 311 is allocated with a label number 1 (311(1)) and then added as a fourth of the list L1 (step S29). Thereby, the element number N of the list L1 becomes 4.

Thereafter, the variable k becomes 3 (<N) (step S30) and then it is judged whether or not in the vicinity of the three-dimensional point 314 that is the third of the list L1, the three-dimensional point 31 of a label number of 0 is present (step S28). In this case, the three-dimensional point 31 of a label number of 0 is not present in the vicinity of the three-dimensional point 314 and therefore, the element number N remains as 4 and k becomes 4 (step S30). Then, it is judged whether in the vicinity of the three-dimensional point 311 that is the fourth of the list L1, the three-dimensional point 31(0) of a label number of 0 is present (step S28). In this case, the three-dimensional point 31 of a label number of 0 is not present in the vicinity of the three-dimensional point 311 and therefore, the element number N remains as 4 and k becomes 5 (step S30).

At that time, the variable k becomes larger than the element number N and therefore, preparation of the list L1 having a label number of 1 is ended and then the label number is set as 2 (step S32) to repeat the same processing. In repetition processing, for example, three-dimensional points 315 and 316 having a label number of 0 are allocated with a label number 2, and three-dimensional points 315(2) and 316(2) are added to a list L2; and a three-dimensional point 317 having a label number of 0 is allocated with a label number 3 and a three-dimensional point 317(3) is added to a list L3. Thereby, the three-dimensional point 31 having a label number of 0 becomes absent and therefore, a determination of No is made in step S24 and then connected set calculation processing is ended to move to step S3 of FIG. 2.

Step S3 calculates a position of each connected set 32 determined in step S2. The position of a connected set 32 in this case is a position representing the connected sets 32, and, for example, a gravity center position of three-dimensional points 31 belonging to a connected set 32 is calculated as a position of the connected set 32. In order to calculate the gravity center position, all the three-dimensional points 31 belonging to the connected set 32 are employable, or three-dimensional points 31 selected by separately introducing processing such as outlier countermeasures are also employable.

For the outlier countermeasures, for example, initially, a gravity center position is determined using all the three-dimensional points 31 belonging to the connected set 32 for gravity center calculation, and when three-dimensional points 31 having at least a predetermined value of a distance from the gravity center position exist among the three-dimensional points 31 used for gravity center calculation, three-dimensional points 31 of a predetermined ratio are eliminated from the three-dimensional points 31 used for gravity center calculation in descending order of the distance from the gravity center position. Then, the remaining three-dimensional points 31 are used for gravity center calculation to recalculate a gravity center position. This processing may be repeated until all the three-dimensional points 31 used for gravity center calculation fall within the predetermined distance from the gravity center position.

Then, step S4 applies main component analysis to each connected set 32 and calculates an inertial main axis 33 of the connected set 32. For example, initially, a gravity center position of the connected set 32 determined in step S2 and differences between the gravity center position and three-dimensional points 31 configuring the connected set 32 are calculated, and then a covariance matrix with respect to the gravity center position of the connected set 32 is calculated. Then, an eigenvector of the covariance matrix is calculated. The connected set 32 is a set of three-dimensional points 31 in a three-dimensional space and therefore, three eigenvectors are determined. Of three eigenvalues corresponding to the three eigenvectors, a vector having a maximum eigenvalue, i.e., an axis in a direction where a variance of the three-dimensional points 31 included in the connected set 32 is maximized is calculated as the inertial main axis 33 of the connected set 32.

Figure 7:
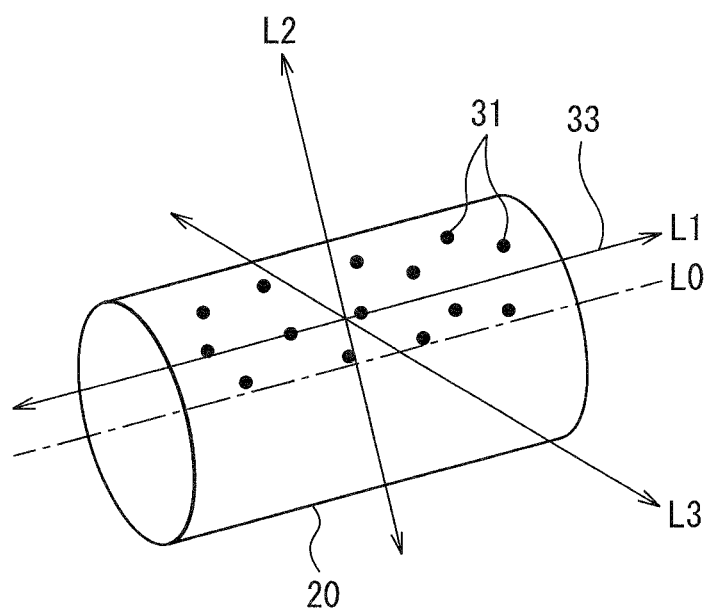
FIG. 7 is a view illustrating one example of an inertial main axis of a connected set.

FIG. 7 is a view illustrating one example of the inertial main axis 33. As illustrated in FIG. 7, on a surface of a cylindrically shaped article 20, a variance of three-dimensional points 31 in a longitudinal direction is maximized. Therefore, in parallel to a center axis line L0 passing through the center of the article 20, a first main component corresponding to the maximum eigenvalue appears. A direction L1 of this first main component becomes a direction of the inertial main axis 33. In the figure, L2 represents a direction of a second main component where a variance of three-dimensional points 31 has a second largest value next to the first main component. The second main component direction L2 is at a right angle to the first main component direction L1. L3 represents a direction of a third main component at a right angle to both the first main component direction L1 and the second main component direction L2. These three main components correspond to the three eigenvalues.

Figure 8:
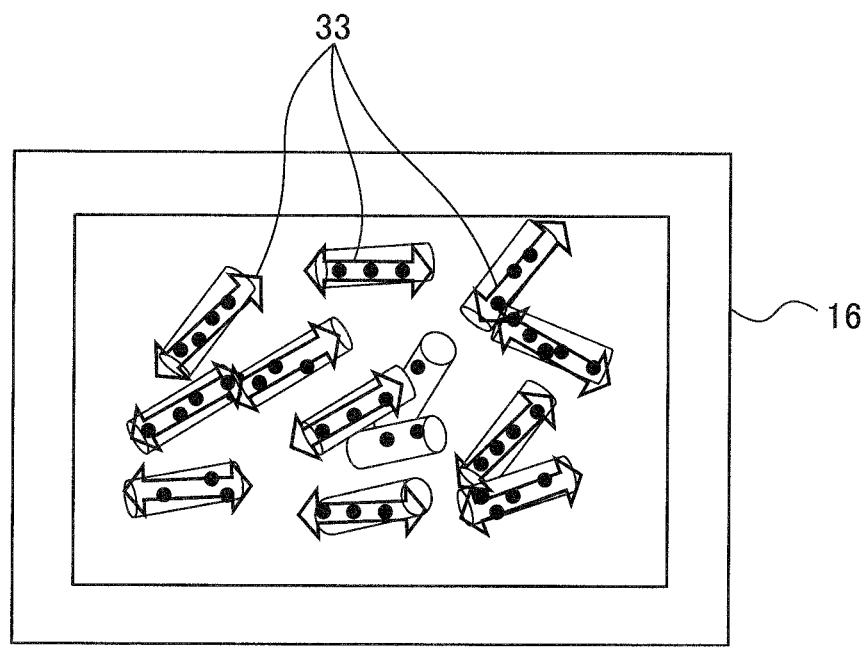
FIG. 8 is a view illustrating one example of inertial main axes of connected sets corresponding to a plurality of articles randomly piled in a container.

FIG. 8 is a plan view illustrating one example of the inertial main axes 33 of connected sets 32 corresponding to a plurality of articles 20 randomly piled in a container. As illustrated in FIG. 8, an inertial main axis 33 is set for each article 20 and therefore, the inertial main axis 33 makes it possible to identify a posture of the article 20.

Step S4 calculates the inertial main axis 33 and then the processing moves to step S5 to calculate a plane surface or a curved surface configured with three-dimensional points 31 configuring a connected set 32 based on positions of the three-dimensional points 31 belonging to the same connected set 32. The plane surface or the curved surface can be determined by a least-squares method using all the three-dimensional points 31 included in the connected set 32. The plane surface or the curved surface may also be determined by separately using outlier countermeasures of some sort. As a method for outlier countermeasures, several methods such as an M-estimation method, RANSAC, LMedS, Hough transform are available. When processing such as Hough transform is introduced, one plane surface can be extracted and recognized from a connected set 32 even when existing across surfaces of a plurality of articles 20.

Figure 9:
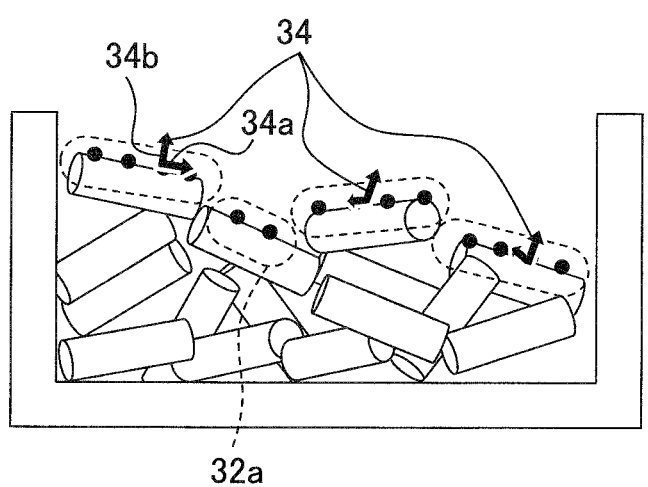
FIG. 9 is a view illustrating one example of a representative position posture representing a connected set.

Step S6 calculates a representative position posture 34 which is a position and a posture representing each connected set 32. FIG. 9 is a view illustrating one example of the representative position posture 34. The representative position posture 34 is expressed using a pair of arrows 34a and 34b intersecting at a right angle. An intersection of the pair of arrows 34a and 34b, i.e., a position (representative position) of the representative position posture 34 is the gravity center position of a connected set 32 determined in step S3, and directions of the arrows 34a and 34b indicate a posture of the representative position posture 34. FIG. 9 illustrates the representative position posture 34 using two arrows 34a and 34b for convenience, but the representative position posture 34 is not present in a two-dimensional space but in a three-dimensional space, and therefore, actually expressed in a three-dimensional orthogonal coordinate system. Instead of the orthogonal coordinate system, various coordinate systems may express the representative position posture 34.

Upon calculating the representative position posture 34, step S6 calculates a normal vector in a representative position of a connected set 32 of the plane surface or the curved surface determined in step S5. This normal vector is equivalent to the arrow 34b of the representative position posture 34. On the other hand, the arrow 34a is equivalent to the direction of the inertial main axis 33 determined in step S4. Use of the representative position posture 34 makes it possible to identify not only a position of the article 20 but also an extending direction of the article 20 and an inclination thereof, i.e., a posture of the article 20.

Step S6 calculates an area of a region where three-dimensional points 31 belonging to a connected set 32 exist but does not acquire a representative position posture 34 from a connected set 32a having an area which is smaller than a predetermined value, as illustrated in FIG. 9. In other words, the representative position posture 34 is determined only for a connected set 32 having a surface determined to be sufficiently exposed, and a connected set 32 where no representative position posture 34 is determined is not allowed to be a subject for article pickup. This makes it possible to prevent the hand 14 from approaching an article 20 on the deep side where a part of the upper surface of the article 20 is covered with another article 20 and to inhibit the hand 14 from colliding with an article 20 other than a subject to be picked up.

Figure 10:
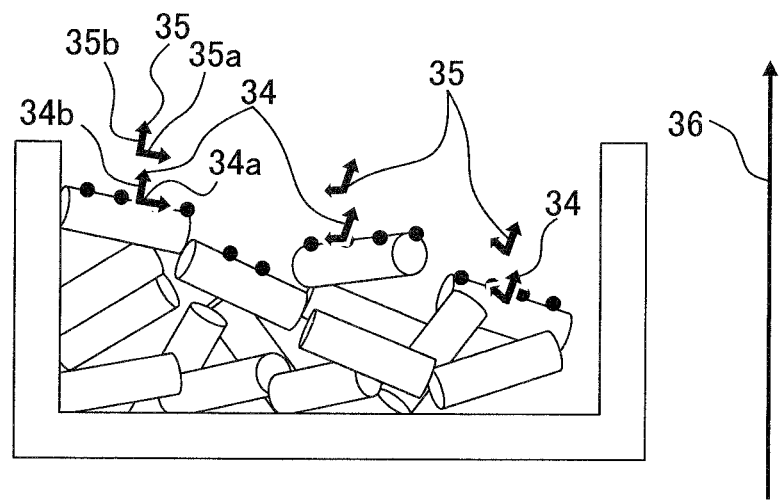
FIG. 10 is a view illustrating one example of a hand position posture corresponding to the representative position posture of FIG. 9.

Then, step S7 calculates a hand position posture 35 corresponding to each representative position posture 34. FIG. 10 is a view illustrating one example of the hand position posture 35 corresponding to the representative position posture 34. The hand position posture 35 is illustrated using a pair of arrows 35a and 35b intersecting at a right angle in the same manner as for the representative position posture 34.

As a method for determining a position (an intersection of the arrows 35a and 35b) and a posture (directions of the arrows 35a and 35b) of the hand position posture 35, several methods are available for each. Regarding the position, a method in which, for example, a position of the representative position posture 34 is directly assigned as a position of the hand position posture 35 is available. As another example, there is also available a method in which a position moved by a predetermined length in a direction of a predetermined coordinate axis 36 (for example, Z-axis) from a position of the representative position posture 34 is assigned as a position of the hand position posture 35. Regarding the posture, a method in which, for example, a posture of the representative position posture 34 is directly assigned as a posture of the hand position posture 35 can be employed. As another example, there is also a method in which when a position of the representative position posture 34 is close to a wall of the container 16, the hand 14 is tilted to a direction away from the wall to avoid a collision between the wall and the hand 14.

In FIG. 10, one obtained by moving the representative position posture 34 parallel to a direction of the predetermined coordinate axis 36 by the predetermined length is designated as the hand position posture 35. Therefore, the arrows 34a and 34b of the representative position posture 34, i.e., a direction of the inertial main axis 33 of the connected set 32 and a normal vector direction of a surface where the connected set 32 is configured and the arrows 35a and 35b of the hand position posture 35 are parallel to each other, respectively.

Figure 11:
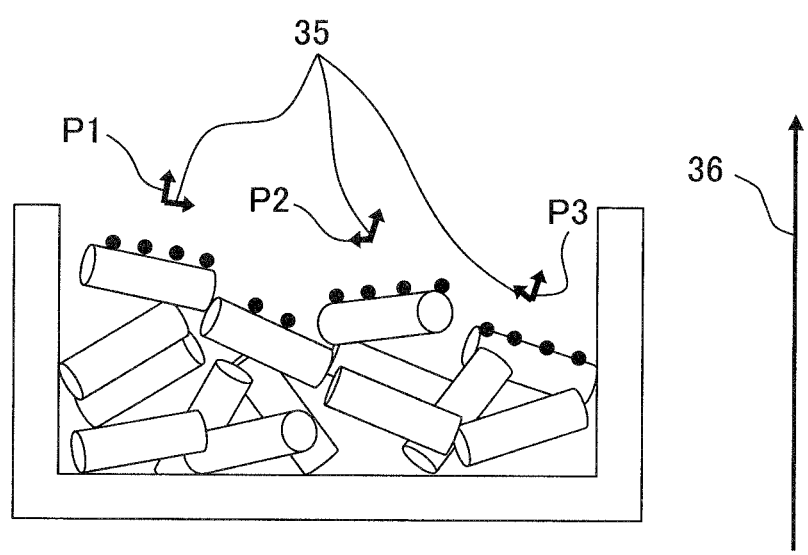
FIG. 11 is a view illustrating one example of numbering for the hand position posture of FIG. 10.

Step S8 numbers the respective hand position postures 35 as P1, P2, . . . , Pn. Here, n represents the number of hand position postures 35. FIG. 11 is a view illustrating the numbered hand position postures 35, and numbering is performed in descending order of a coordinate value with respect to the predetermined coordinate axis 36, i.e., in order from one located in a higher position. As the order of numbering, in addition to a descending order of a coordinate value, there is employable an order such as a descending order of an area of a surface where the connected set 32 is configured and the like determined by an arbitrary method based on an acquired three-dimensional point set. In FIG. 11, n=3.

In Step S9, an initial value is provided to a variable j having a natural number value. In other words, processing for j←1 is executed. The variable j is used to specify the number of the hand position posture 35.

Figure 12:
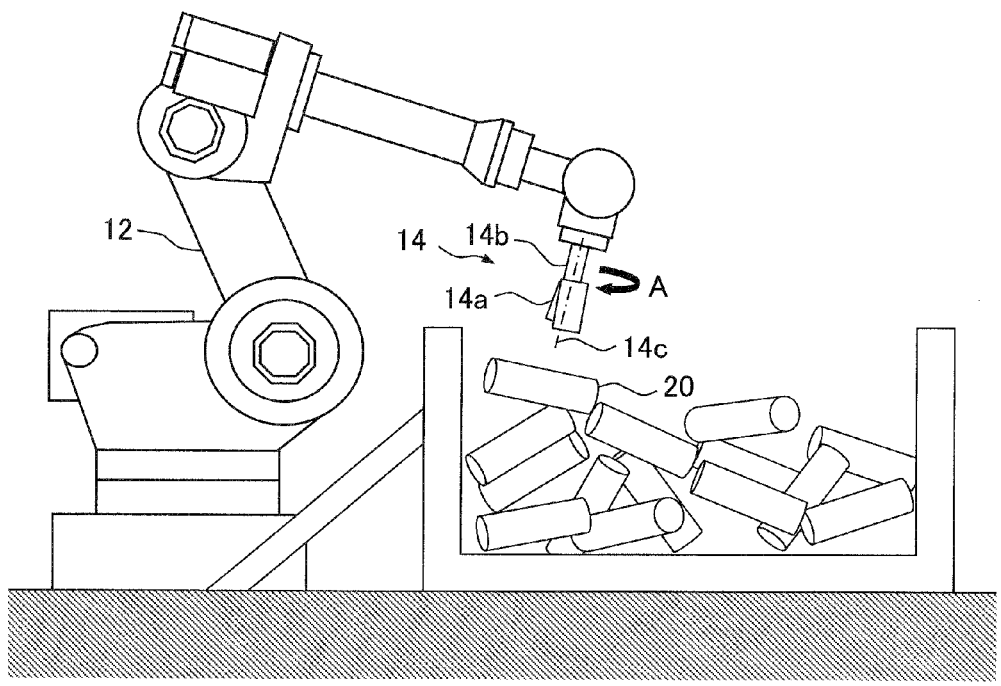
FIG. 12 is a view illustrating one example of an operation of the article pickup apparatus according to the embodiment of the present invention.

Step S10 outputs a control signal to a robot driving actuator (an electric motor) and moves the hand 14 to a hand position posture Pj (for example, P1) as illustrated in FIG. 12. At that time, a control signal is output to a hand driving actuator to orient the axis line 14c of the rotary shaft 14b of the hand 14 to a normal vector (the position and the direction of the arrow 35b of FIG. 10) and to make the rotary shaft 14b rotate around the axis line 14c so that a pair of grip units 14a is located symmetrically to the arrow 35a of FIG. 10. Thereby, the pair of grip units 14a is disposed on both sides of the inertial main axis 33 in the longitudinal direction of the article 20, which makes it possible to achieve a predetermined relative position posture of the hand 14 for an article 20 to be picked up.

Figure 13:
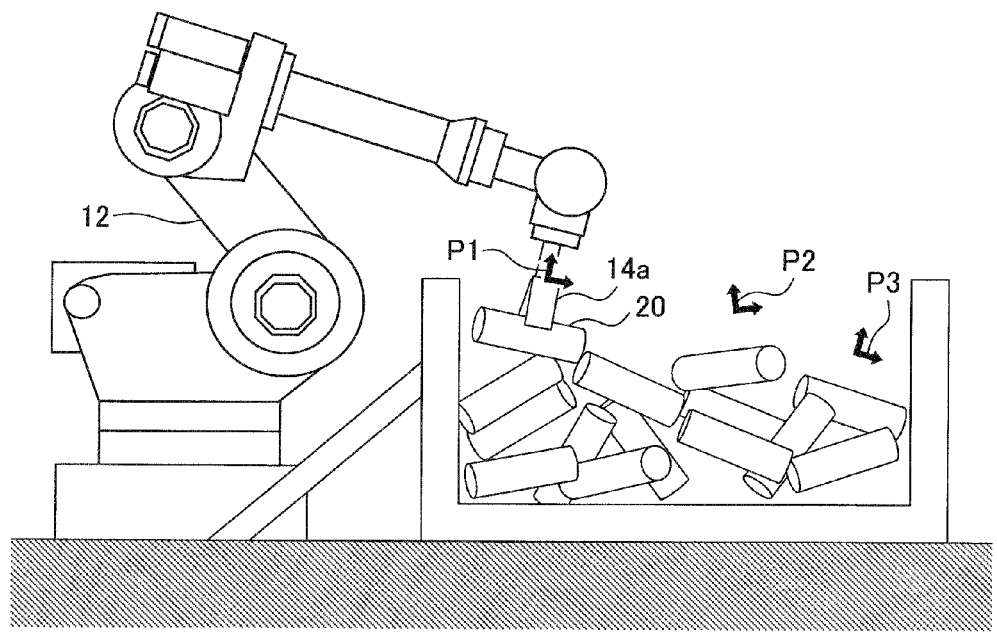
FIG. 13 is a view illustrating one example of an operation following the operation in FIG. 12.

Step S11 outputs a control signal for holding the article 20 to the hand driving actuator. Thereby, as illustrated in FIG. 13, the grip unit 14a of the hand 14 grips an outer periphery of the article 20. A pair of grip units 14a is disposed symmetrically to the center axis line L0 (FIG. 7) of the article 20 and therefore, the grip unit 14a can hold stably the article 20. In this case, when, for example, the grip unit 14a includes a suction nozzle, a vacuum pump is operated to suction and hold the article 20 by a suction force. When the grip unit 14a includes an attracting magnet, current is allowed to flow in an electromagnetic coil and the magnet is operated to attract and hold the article 20 by a magnetic force. When the grip unit 14a includes a chuck, the article 20 is held by opening or closing the chuck.

Figure 14:
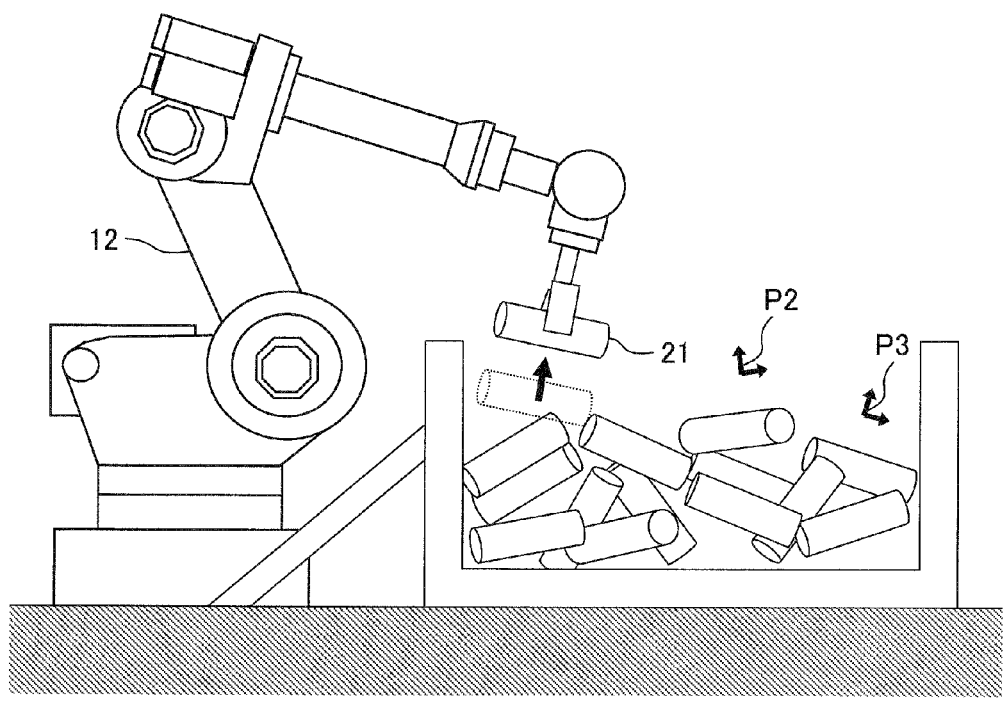
FIG. 14 is a view illustrating one example of an operation following the operation in FIG. 13.

Then, step S12 outputs a control signal to the robot driving actuator and raises the hand 14 holding the article 21 in a predetermined direction, e.g., the arrow 35b direction of the hand position posture 35 (FIG. 10) or the predetermined coordinate axis 36 direction, as illustrated in FIG. 14. When the hand 14 is raised in the predetermined direction, a collision with the article 21 and a collision between the grip unit 14a and another article 20 are avoidable upon moving the hand 14 by an operation of the robot 12.

Step S13 judges whether the grip unit 14a has succeeded in holding the article 21. In this judgment, when, for example, the grip unit 14a includes an attracting magnet, it is possible for a proximity sensor to judge whether the article 21 exists to judge whether a hold has been successfully performed according to the judgment result. When the grip unit 14a includes a suction nozzle, it is possible to determine whether a hold has been successfully performed according to a change of a flow rate or a pressure of air during suction. When the grip unit 14a includes a chuck, it is possible to judge whether a hold has been successfully performed by confirming an opening or closing state of the chuck using an opening/closing confirmation sensor. When it is judged that the hold has been successfully performed, the processing moves to step S14. When it is judged that the hold has not been successfully performed, the processing moves to step S15.

Figure 15:
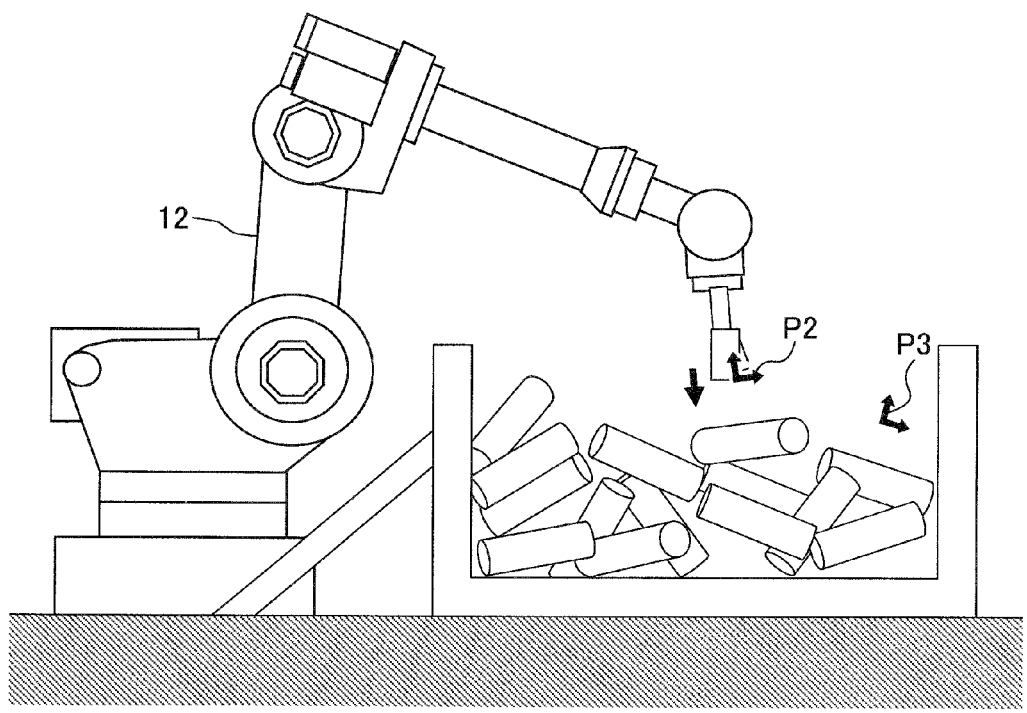
FIG. 15 is a view illustrating one example of an operation following the operation in FIG. 14.
Figure 16:
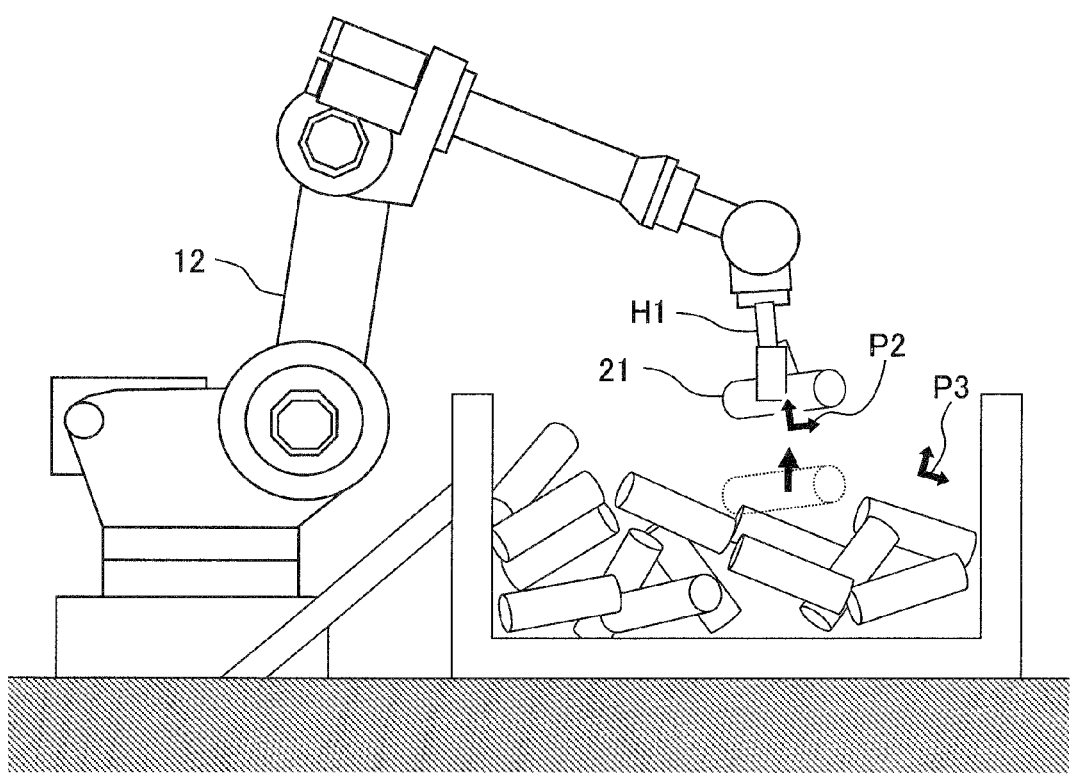
FIG. 16 is a view illustrating one example of an operation following the operation in FIG. 15.

Step S15 judges whether j≥n. This judgment is a judgment whether any hand position posture the hand 14 has not reached yet exists among n (3 in FIG. 14) hand position postures 35. When j<n is judged, the hand 14 has not reached yet a hand position posture Pj+1 and therefore, processing for j←j+1 is executed in step S16 and then the processing returns to step S10. Then, as illustrated in FIG. 15, an operation of the robot 12 moves the hand 14 to the next hand position posture Pj (for example, P2). Then, a control signal for holding the article 20 is output to the hand driving actuator, and as illustrated in FIG. 16, the next article 21 is held (step S11). When step S15 judges that j≥n, the hand 14 has reached all n hand position postures 35 and therefore, the processing moves to step S16.

Figure 17:
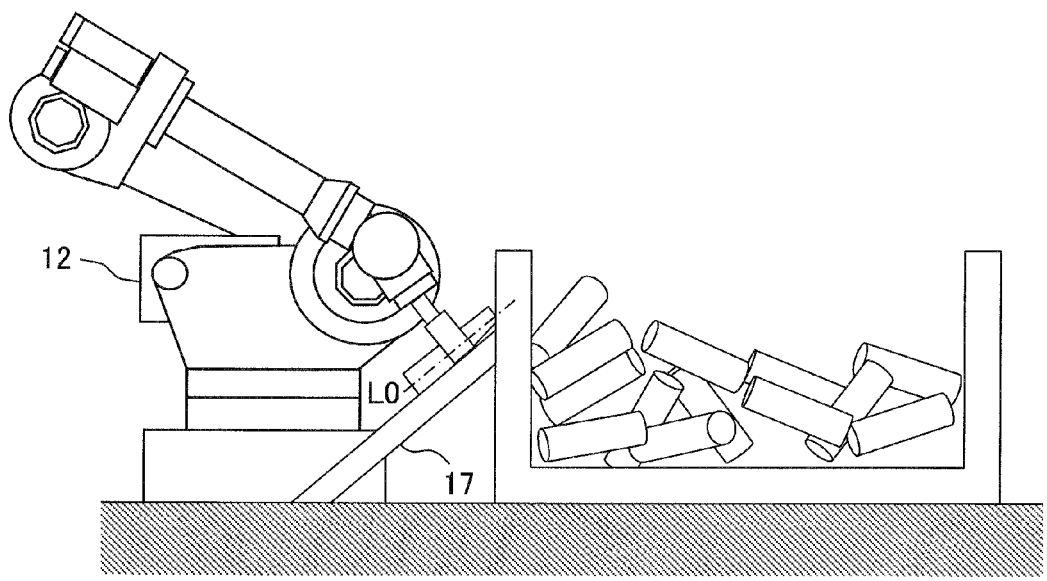
FIG. 17 is a view illustrating one example of an operation following the operation in FIG. 16.

Step S14 outputs a control signal to the robot driving actuator to move the hand 14 to above the discharge apparatus 17 so as to have a predetermined relative position posture with respect to the discharge apparatus 17, as illustrated in FIG. 17. When, for example, the discharge apparatus 17 includes a shooter extending obliquely downward as illustrated in FIG. 17, a position posture of the hand 14 is controlled so that the center axis line L0 of the article 21 is directed to an extending direction of the shooter. Thereafter, a control signal is output to a grip unit driving actuator to remove the article 21 from the grip unit 14a. The discharge apparatus 17 may be a belt conveyor or the like instead of the shooter. This indicates the end of one cycle of the processing.

The present embodiment makes it possible to achieve the following operations and effects.

(1) In the present embodiment, surface positions of a plurality of articles 20 randomly piled in a three-dimensional space are measured using the three-dimensional measurement instrument 11 to acquire position information of a plurality of three-dimensional points 31 (step S1); a connected set 32 made by connecting three-dimensional points 31 present in the vicinity of each other is determined from these plurality of three-dimensional points 31 (step S2); a position and a posture of the article 20 are identified based on position information of three-dimensional points 31 belonging to the connected set 32 (step S6); a hand position posture 35 capable of picking up the article 20 is determined (step S7); and further the robot 12 is controlled so that the hand 14 is moved to the hand position posture 35 to pick up the article 20 (step S10 to step S12).

This makes it possible to identify a position and a posture of the article 20 without pattern matching or the like. Therefore, any model pattern of the article 20 need not be prepared, and it is possible to easily recognize positions and postures of a large number of different types of or indefinitely shaped articles 20 to hold the articles 20. Further, it is also possible to recognize a position and a posture of a new type of article 20 added, without addition of a model pattern thereto, and it is possible to avoid a recognition failure or a recognition error of a position posture of the article 20 or a pickup failure of the article 20 and a problem such as a collision and the like to effectively pick up the article 20 by quickly moving the hand 14 to an article 20 to be easily picked up located on an upper side. Further, a position and a posture of the article 20 is identified using the connected set 32 and therefore, a three-dimensional measurement instrument using a measurement method other than stereoscopic photography is also usable and this makes it possible to achieve operations and effects using various apparatus configurations.

(2) When a posture of the article 20 is identified, a main component direction (a direction of the inertial main axis 33) of a connected set 32 is calculated by applying main component analysis to three-dimensional points 31 belonging to the connected set 32 and then the posture of the article is identified based on this main component direction. This makes it possible to identify a direction and an inclination of the longitudinal direction of an article 20 having a cylindrical shape or the like and to stably hold the article 20 using the hand 14 including a bifurcated grip unit 14a. Further, the article 20 is gripped using the hand 14 in consideration of the main component direction and therefore, it is possible that the gripped article 20 is disposed on a base or a discharge apparatus such as a shooter and the like with a predetermined posture and a discharge step of the article 20 is easily performed. In contrast, with no consideration of the main component direction, it is necessary to confirm a grip posture of the article 20 using a camera or the like and therefore, the discharge step becomes complex.

(3) A covariance matrix for a gravity center position of a connected set 32 is calculated from differences between the gravity center position of the connected set 32 and three-dimensional points 31 belonging to the connected set 32, and a main component direction is calculated using an eigenvector where an eigenvalue of this covariance matrix is maximized and therefore, it is possible that the main component direction successfully accords with the longitudinal direction of the article 20 and then a posture of the article 20 is accurately identified.

(4) A position representing a connected set 32 is determined based on a gravity center position of the connected set 32 and also a posture representing the connected set 32 is determined based on a main component direction (step S6); and a hand position posture 35 corresponding to a representative position posture 34 which is a position and a posture representing the connected set 32 is determined (step S7). Thereby, when a surface of the article 20 is inclined, it is possible to calculate the representative position posture 34 according to the inclination and to stably hold the article 20 by tilting the hand 14 according to the inclination of the article 20.

(5) When a first main component direction, a second main component direction, and a third main component direction of a connected set 32 are calculated by applying main component analysis to three-dimensional points belonging to the connected set 32, the hand position posture 35 can also be determined based on the first main component direction, the second main component direction, and the third main component direction. When three main component directions are taken into consideration in this manner, an article 20 having a complex shape can be easily gripped using the grip unit 14a.

(6) A connected set 32 is configured by connecting three-dimensional points 31 present within a predetermined distance from each other (FIG. 6), resulting in a possibility of recognizing individual articles 20 from a plurality of articles 20 randomly piled. Therefore, even when articles 20 are disposed in the container 16 in an overlapping manner or even when there is a deficit in data of a three-dimensional point set 30 such as the case where it is difficult to optically acquire position data of three-dimensional points 31 due to diffuse reflection of an article surface or the like, a position and a posture of the article 20 can be recognized.

An article pickup method for picking up articles 20 randomly piled in a three-dimensional space may be configured in any manner when the following is satisfied: a connected set 32 made by connecting three-dimensional points 31 present in the vicinity of each other is determined from a plurality of three-dimensional points 31 acquired using the three-dimensional measurement instrument 11; a position and a posture of an article 20 are identified based on position information of three-dimensional points 31 belonging to the connected set 32; a hand position posture 35 capable of picking up the identified article 20 is determined; the robot 12 is controlled to pick up the article 20 by moving the hand 14 to the determined hand position posture 35; and further, when the posture of the article 20 is identified, a main component direction of the connected set 32 is calculated by applying main component analysis to the three-dimensional points 31 belonging to the connected set 32 and the posture of the article 20 is identified based on this main component direction.

Figure 18:
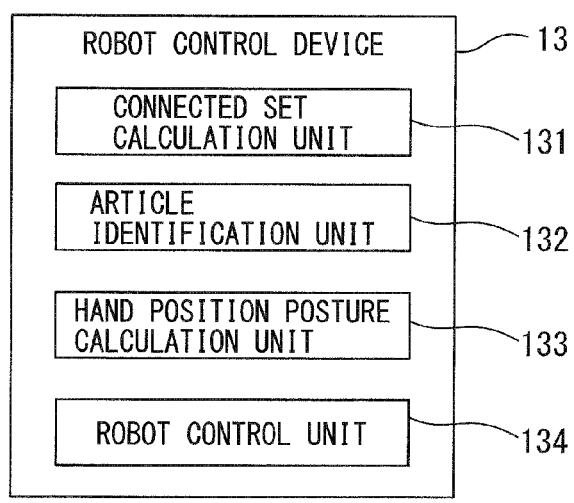
FIG. 18 is a block diagram illustrating an internal configuration of the robot control device of FIG. 1.

FIG. 18 is a block diagram illustrating an internal configuration of the robot control device 13 of FIG. 1. The robot control device 13 includes a connected set calculation unit 131, an article identification unit 132, a hand position posture calculation unit 133, and a robot control unit 134.

Upon calculating a connected set 32 in the connected set calculation unit 131, only when, for example, a predetermined distance is determined with respect to each of predetermined coordinate systems from one-dimension to three-dimension and then a distance between a first three-dimensional point 31 and a second three-dimensional point 31 falls within the predetermined distance in every predetermined coordinate system, it is possible to judge that the first three-dimensional point 31 and the second three-dimensional point 31 are present in the vicinity of each other to connected both points. In other words, a configuration of the connected set calculation unit 131 is not limited to the configuration described above, when a connected set 32 made by connecting three-dimensional points 31 present in the vicinity of each other is determined from a plurality of three-dimensional points 31 acquired using the three-dimensional measurement instrument 11.

In the above-described embodiment, a covariance matrix for a gravity center position of a connected set 32 is calculated from differences between the gravity center position of the connected set 32 and three-dimensional points 31 belonging to the connected set 32, and a main component direction (an inertial main axis 33) is calculated using an eigenvector where an eigenvalue of this covariance matrix is maximized, but the article identification unit 132 may be configured in any manner, when a main component direction of the connected set 32 is calculated by applying main component analysis to the three-dimensional points 31 belonging to the connected set 32 and a posture of the article 20 is identified based on this main component direction.

In the above-described embodiment, a representative position of the article 20 is identified based on a gravity center position of the connected set 32 and a representative posture (the arrows 34a and 34b of FIG. 9) of the article 20 is identified based on an inertial main axis 33 of the connected set 32 and a normal vector of a surface where the connected set 32 is configured, but it is possible to identify a representative position posture 34 of the article 20 and a hand position posture 35 based on a first main component direction L1, a second main component direction L2, a third main component direction L3 of the connected set 32 obtained via main component analysis. For example, it is possible that the arrow 34*b* of FIG. 9 representing the representative position posture 34 is allowed to accord with the second main component direction L2 to determine the hand position posture 35 (the arrow 35*b* of FIG. 10) based on the second main component direction L2. Thereby, processing of step S5 of FIG. 2 becomes unnecessary.

In the above-described embodiment, with consideration of an extending direction and an inclination of an article 20 having a rectangular shape, a position posture of the hand 14 capable of gripping the article 20 using a pair of grip units 14*a* is designated as the hand position posture 35, but the article pickup apparatus of the present invention is applicable to articles having various shapes. Therefore, setting of the hand position posture 35 is appropriately changeable according to a shape of the article 20, and a configuration of the hand position posture calculation unit 133 for determining the hand position posture 35 capable of picking up the article 20 is not limited to the configuration described above.

In the above-described embodiment, an article 20 in the container 16 is held using the hand 14 and then the held article 21 is conveyed to the discharge apparatus 17, but the article 21 may be conveyed to any location other than the discharge apparatus 17. Therefore, the robot control unit 134 may be configured in any manner, when the hand 14 is moved to the hand position posture 35 determined using the hand position posture calculation unit 133 to control the robot 12 to pick up the article 20.

It is possible to optionally combine the above-described embodiment with one modified example or a plurality of modified examples.

According to the present invention, when a position and a posture of an article randomly piled in a three-dimensional space are recognized, a connected set is determined from position information of a plurality of three-dimensional points acquired using a three-dimensional measurement instrument and then the position and the posture of the article are identified using the connected set. In particular, regarding the posture of the article, a main component direction of a connected set is calculated by applying main component analysis to three-dimensional points belonging to the connected set and then the posture of the article is identified based on this main component direction. Therefore, a position and a posture of an article can be easily recognized without preparing a model pattern for the article. Further, those other than a three-dimensional measurement instrument of a type of acquiring an image via stereoscopic photography are usable and therefore, more variations are employable for the apparatus.

The present invention has been described in association with the preferred embodiment, but it should be understood by those skilled in the art that various modifications and conversions may be made without departing from the disclosed scope of the claims to be described later.

The invention claimed is:

1. An article pickup apparatus comprising:
   a robot including a hand capable of holding an article;
   a three-dimensional measurement instrument measuring surface positions of a plurality of articles randomly piled on a three-dimensional space to acquire position information of a plurality of three-dimensional points on surfaces of articles;
   a connected set calculation unit determining a connected set made by connecting three-dimensional points present in the vicinity of each other among the plurality of three-dimensional points acquired by the three-dimensional measurement instrument;
   an article identification unit identifying a position and a posture of an article based on the position information of three-dimensional points belonging to the connected set,
   wherein the article identification unit calculates a main component direction of the connected set by applying main component analysis to the three-dimensional points belonging to the connected set, and identifies the posture of the article based on the main component direction;
   a hand position posture calculation unit determining a hand position posture, the hand position posture being a position and a posture of the hand capable of picking up the article identified by the article identification unit; and
   a robot control unit controlling the robot so as to move the hand to the hand position posture determined by the hand position posture calculation unit to pick up the article.

2. The article pickup apparatus according to claim 1, wherein
   the article identification unit calculates a covariance matrix for a gravity center position of the connected set from differences between the gravity center position of the connected set and the three-dimensional points belonging to the connected set, and calculates the main component direction using an eigenvector where an eigenvalue of the covariance matrix is maximized.

3. The article pickup apparatus according to claim 1, wherein
   the article identification unit determines a position representing the connected set based on a gravity center position of the connected set and determines a posture representing the connected set based on the main component direction, and
   the hand position posture calculation unit determines the hand position posture corresponding to a representative position posture, the representative position posture being the position and the posture representing the connected set.

4. The article pickup apparatus according to claim 3, wherein
   the article identification unit calculates a first main component direction, a second main component direction, and a third main component direction of the connected set by applying the main component analysis to the three-dimensional points belonging to the connected set, and
   the hand position posture calculation unit determines the hand position posture based on the first main component direction, the second main component direction, and the third main component direction.

5. An article pickup method for picking up an article randomly piled on a three-dimensional space using a robot including a hand capable of holding the article, the method comprising:
   measuring, by a three-dimensional measurement instrument, surface positions of a plurality of articles randomly piled on the three-dimensional space to acquire position information of a plurality of three-dimensional points on surfaces of articles;
   determining a connected set made by connecting three-dimensional points present in the vicinity of each other among the plurality of three-dimensional points acquired by the three-dimensional measurement instrument;

identifying a position and a posture of an article based on the position information of three-dimensional points belonging to the connected set,
  wherein the identifying the posture of the article includes calculating a main component direction of the connected set by applying main component analysis to the three-dimensional points belonging to the connected set, and identifying the posture of the article based on the main component direction;
determining a hand position posture, the hand position posture being a position and a posture of the hand capable of picking up the article, the position and the posture of which are identified; and
controlling the robot so as to move the hand to the hand position posture determined to pick up the article.

* * * * *